(No Model.)

2 Sheets—Sheet 1.

R. KIFT.
FLOWER VASE WITH BACKGROUND.

No. 338,845. Patented Mar. 30, 1886.

WITNESSES
George W Seltzer
Matt Clifton

INVENTOR
Robert Kift
by
Allen H Gangewer
his
ATTORNEY (No Model.) 2 Sheets—Sheet 2.

R. KIFT.
FLOWER VASE WITH BACKGROUND.

No. 338,845. Patented Mar. 30, 1886.

WITNESSES
George W Seltzer
Matt Clifton

INVENTOR
Robert Kift
by
Allen H. Gangewer
his
ATTORNEY

UNITED STATES PATENT OFFICE.

ROBERT KIFT, OF PHILADELPHIA, PENNSYLVANIA.

FLOWER-VASE WITH BACKGROUND.

SPECIFICATION forming part of Letters Patent No. 338,845, dated March 30, 1886.

Application filed March 24, 1885. Serial No. 159,906. (No model.)

*To all whom it may concern:*

Be it known that I, ROBERT KIFT, of Philadelphia, in the county of Philadelphia and State of Pennsylvania, have invented a new and valuable Improvement in Flower-Vase with Background; and I do hereby declare that the following is a full, clear, and exact description of the construction and operation of the same, reference being had to the annexed drawings, making a part of this specification, and to the letters and figures of reference marked thereon.

Figure 1:
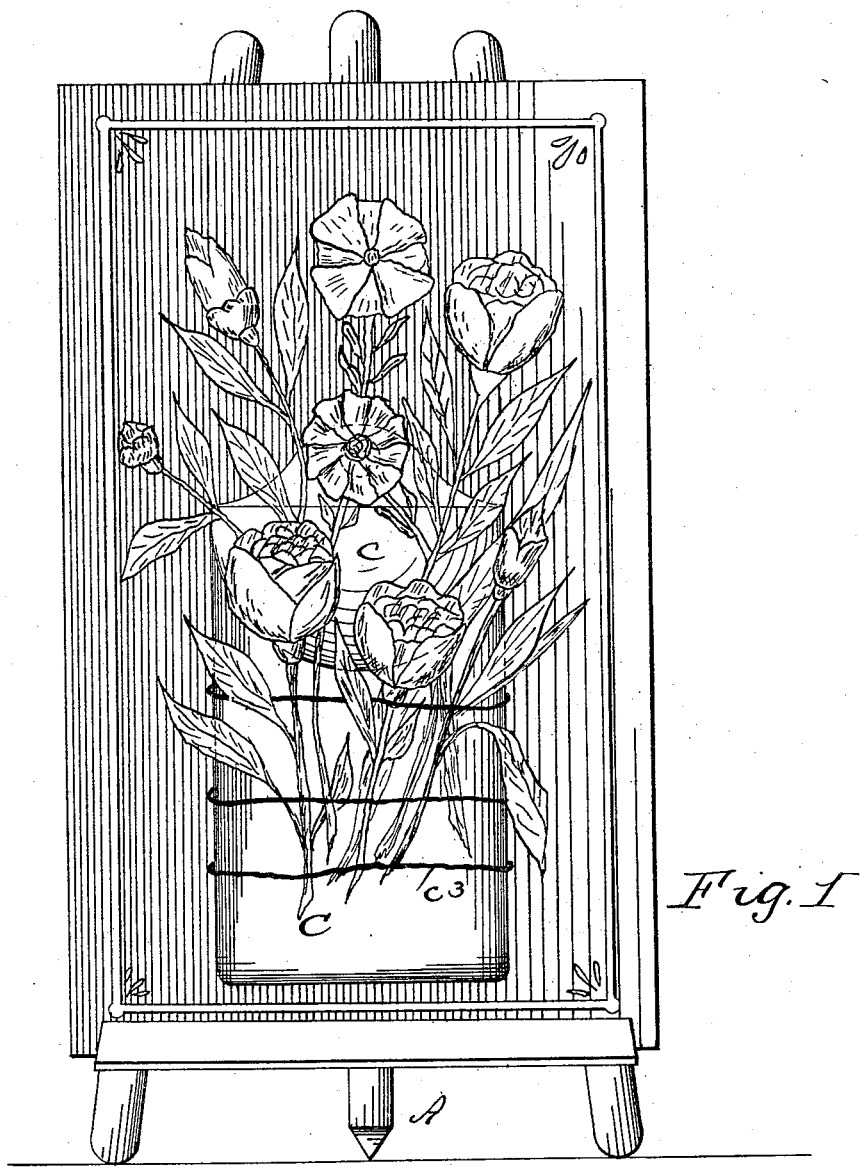
Figure 2:
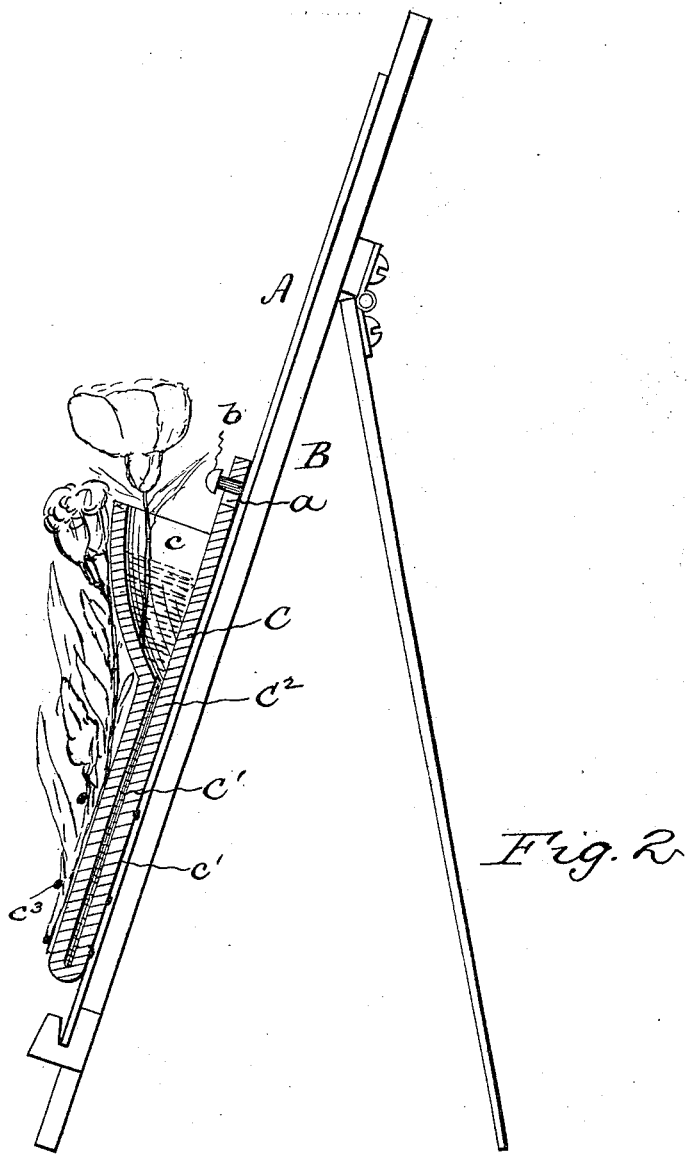

Figure 1 is an elevation of my invention, and Fig. 2 is a side elevation, partly in section.

The object of my invention is to provide means for setting off natural flowers when placed in or attached to a vase or similar receptacle, whereby a few flowers can be made to produce a more beautiful or æsthetic effect than can be obtained by the usual means now employed.

My invention accordingly consists of a porous vase or receptacle so constructed that it will hold a small quantity of water for keeping the flowers fresh, the same being attached to a background. Said background with attached vase may be placed upon an easel or otherwise located, as desired.

In the drawings, A represents the background, which may be a piece of japanned or colored tin, or other substance or similar material, or of bark, of an oblique or other shape, as I do not confine myself to any particular color or combination of the background.

B indicates the easel upon which the background may be placed when the flowers are designed to occupy a position on a center-table or mantel; but when the background is hung upon wall, or otherwise located, the easel is dispensed with.

C represents an oblong or rectangular-shaped vase or receptacle having a well, C′, a wide mouth, c, and openings a for the passage of studs or pins b to hold the vase to the background B, so as to be removable therefrom.

This vase is made of terra-cotta or other suitable porous material, its back $C^2$ being glazed, as indicated by the heavy line c′, to prevent the water in the vase percolating through it to the background A. Plants or flowers are attached to the front or porous part of the vase by copper wire or string $c^3$, or other fastening devices.

For lawns or out-door arrangements, the vase or receptacle C is made in the form of shelves or pockets, or otherwise configured, as desired. By keeping well C′ of vase C filled with water it percolates through the porous part of the vase or its front, and is taken up or absorbed by the plants and flowers, whereby they maintain a fresh appearance for some time.

The background A not only shows off the flowers to a better advantage or makes a more beautiful contrast or effect, but also supports them and their stems so that they may be variously arranged or spread out upon the background to still further heighten the æsthetic effect. If desired, however, said background may be dispensed with, and the vessel or vase C hung upon the wall or otherwise supported, as desired.

What I claim is—

1. A flat oblong vase provided with a porous front part, a glazed rear part, and a well, C′, the said well being intended to receive flower-stems and the front part of the vase to have flower-stems attached thereto in order that moisture may percolate to them through the porous front of said vase, substantially as set forth.

2. A vase provided with a downward flattened extension or well intended to receive flower-stems internally and to have flower-stems bound to it externally, in combination with a colored background, to which said vase is attached, substantially as set forth.

In testimony that I claim the above I have hereunto subscribed my name in the presence of two witnesses.

ROBERT KIFT.

Witnesses:
CHAS. F. VAN HORN,
GEORGE W. LEETZER.